May 31, 1960 — C. W. BAREIS — 2,938,929
SEPARATION OF 1,2,4,5-TETRACHLOROBENZENE FROM ITS ISOMERS
Filed Dec. 12, 1957
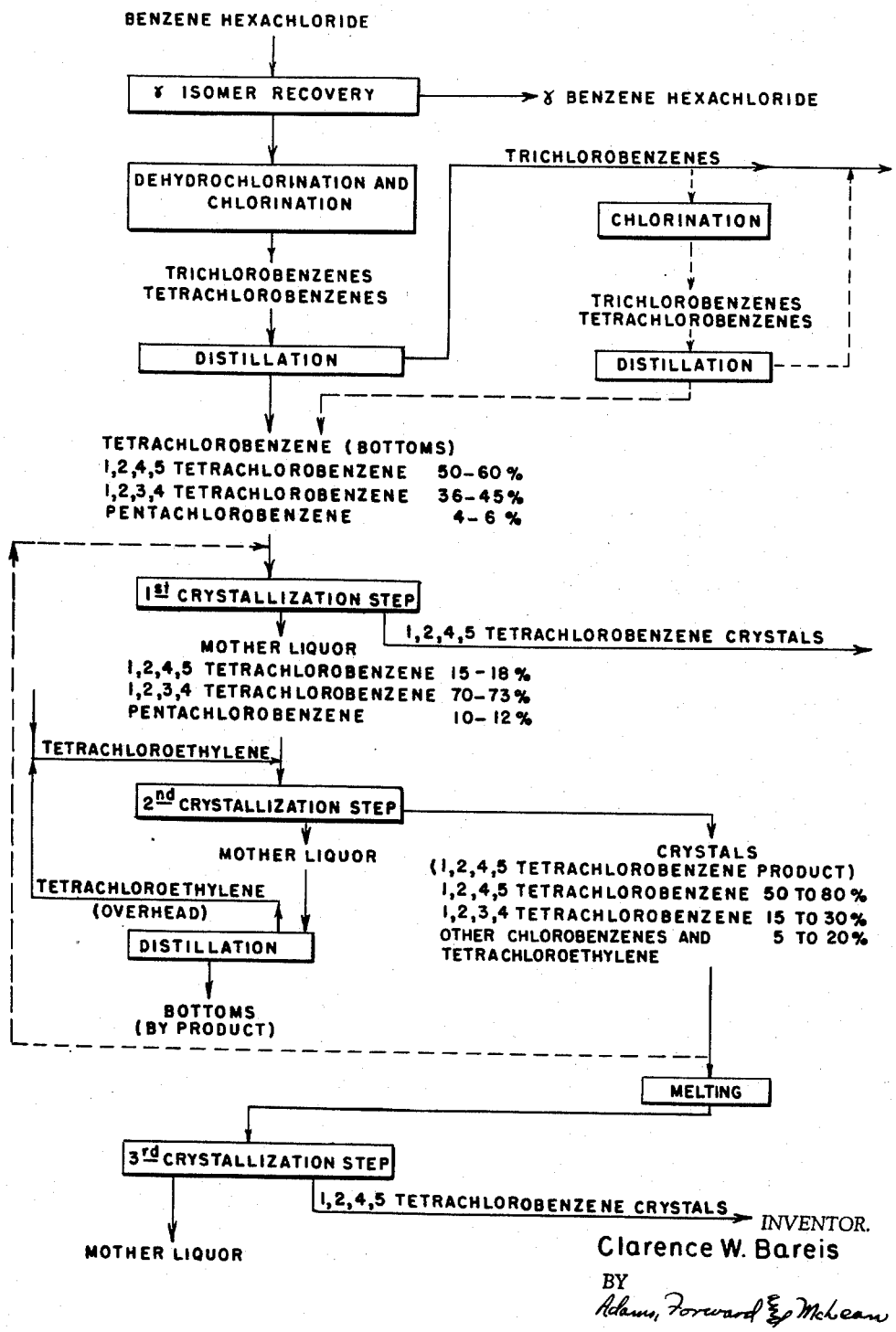
INVENTOR.
Clarence W. Bareis
BY
ATTORNEYS ly pure 1,2,4,5-tetrachlorobenzene, and

United States Patent Office
2,938,929
Patented May 31, 1960

2,938,929

SEPARATION OF 1,2,4,5-TETRACHLOROBENZENE FROM ITS ISOMERS

Clarence W. Bareis, Gasport, N.Y., assignor to Olin Mathieson Chemical Corporation, a corporation of Virginia Filed Dec. 12, 1957, Serial No. 702,453

8 Claims. (Cl. 260—650)

This invention relates to the production of 1,2,4,5-tetrachlorobenzene from mixtures containing 1,2,4,5-tetrachlorobenzene, 1,2,3,4-tetrachlorobenzene and pentachlorobenzene.

1,2,4,5-tetrachlorobenzene is useful as a starting material for the production of 2,4,5-trichlorophenoxy acetic acid which is a herbicide and defoliant. As disclosed in copending application Serial No. 402,174, filed January 4, 1954, of Churchill and Jenney, a mixture containing 1,2,4,5 - tetrachlorobenzene, 1,2,3,4 - tetrachlorobenzene pentachlorobenzene and a small amount of 1,2,3,5-tetrachlorobenzene is obtained by dehydrochlorinating benzene hexachloride to trichlorobenzene, chlorinating the trichlorobenzene and separating excess trichlorobenzene from the resulting product. The 1,2,4,5-tetrachlorobenzene present in the mixture is usually about 45% to 60% of the mixture. As described in copending application Serial No. 402,173, filed January 4, 1954, now abandoned, of Churchill and Jenney, about 80% of the 1,2,4,5-tetrachlorobenzene can be recovered from the mixture in substantially pure form, i.e. 95% or more 1,2,4,5-tetrachlorobenzene, by cooling the mixture to below about 50° C., preferably to a temperature between 50° and 45° C., to crystallize out the 1,2,4,5-tetrachlorobenzene. The mother liquor resulting from the crystallization is essentially a ternary eutectic composition of about 14% to about 15% 1,2,4,5-tetrachlorobenzene, about 70% to about 73% 1,2,3,4-tetrachlorobenzene, and about 10% to about 12% pentachlorobenzene, and contains a small amount of 1,2,3,5-tetrachlorobenzene. This mother liquor, which contains about 20 percent of the total 1,2,4,5-tetrachlorobenzene initially present in the mixture, is discarded or incorporated into other chlorobenzene processes since heretofore it was not known how to recover 1,2,4,5-tetrachlorobenzene from it by crystallization or other economical means.

It has now been discovered that a material enriched in 1,2,4,5-tetrachlorobenzene can be separated from the ternary eutectic composition by dissolving the ternary eutectic in tetrachloroethylene, and cooling the tetrachloroethylene-containing material to a temperature between 15° and 30° C. to crystallize out a product containing 1,2,4,5- and 1,2,3,4-tetrachlorobenzene enriched in 1,2,4,5-tetrachlorobenzene (i.e., the proportion of 1,2,4,5-tetrachlorobenzene to 1,2,3,4-tetrachlorobenzene in the product is greater than the proportion of these tetrachlorobenzene isomers in the eutectic composition). Substantially pure 1,2,4,5-tetrachlorobenzene can be recovered from this enriched product by melting it and then cooling to below about 50° C. preferably to a temperature between 45° C. and 50° C., to crystallize from the melt the substantially pure material. Alternatively, and preferably the enriched product is recycled to the above described recovery step in which the ternary eutectic composition is formed.

In the recovery of 1,2,4,5-tetrachlorobenzene from the above-described mixture derived from benzene hexachloride and containing 45% to 60% 1,2,4,5-tetrachlorobenzene, by first cooling to below about 50° C. to crystallize out substantially pure 1,2,4,5-tetrachlorobenzene, and then recovering additional 1,2,4,5-tetrachlorobenzene according to the invention, if desired, the first cooling step can be terminated at a 1,2,4,5-tetrachlorobenzene concentration in the mother liquor substantially above the concentration of 1,2,4,5-tetrachlorobenzene in the eutectic composition, and the mother liquor having the higher-than-eutectic concentration of 1,2,4,5-tetrachlorobenzene, can then be subjected to treatment with tetrachlorobenzene and cooled according to the invention.

Thus, there can be treated according to the invention a mixture consisting essentially of 1,2,4,5-tetrachlorobenzene, 1,2,3,4-tetrachlorobenzene and pentachlorobenzene in the proportions of less than about 25% 1,2,4,5-tetrachlorobenzene, more than about 60% 1,2,3,4-tetrachlorobenzene and up to about 15% pentachlorobenzene, based on the 1,2,4,5- and 1,2,3,4-tetrachlorobenzene and pentachlorobenzene. The proportion of 1,2,4,5-tetrachlorobenzene can be even higher than 25% but this is not preferred since the function of the tetrachloroethylene is to break the eutectic so that incorporating the tetrachloroethylene in the eutectic composition by adding it where the concentration of 1,2,4,5-tetrachlorobenzene is above 25% increases material load on equipment without benefiting the process until the eutectic composition is approached. Ordinarily it is preferred to interrupt the separation of substantially pure 1,2,4,5-tetrachlorobenzene when the concentration of 1,2,4,5-tetrachlorobenzene in the melt is from about 18% to 20% as stopping at this concentration will preclude inadvertently continuing the separation to the eutectic composition which would result in contamination of substantially pure material with material of the composition of the eutectic.

The use of tetrachloroethylene according to the invention can also be employed to obtain substantially pure 1,2,4,5-tetrachlorobenzene from mixtures consisting essentially of 1,2,4,5-tetrachlorobenzene, 1, 2, 3, 4-tetrachlorobenzene and pentachlorobenzene and containing less 1,2,4,5-tetrachlorobenzene than is present in the eutectic, e.g., as little as 10% or even less 1,2,4,5-tetrachlorobenzene and up to 85% or more 1,2,3,4-tetrachlorobenzene and 5% or more pentachlorobenzene. Mixtures containing only a small percentage of 1,2,4,5-tetrachlorobenzene can be subjected to a series of treatments, each involving the use of tetrachloroethylene and cooling to crystallize a product enriched in 1,2,4,5-tetrachlorobenzene, to obtain progressive enrichment in 1,2,4,5-tetrachlorobenzene until the proportion of 1,2,4,5-tetrachlorobenzene is sufficient to permit crystallization therefrom of substantially pure 1,2,4,5-tetrachlorobenzene. Preferably, the mixture crystallized from tetrachloroethylene according to the invention contains at least about 13% 1,2,4,5-tetrachlorobenzene based on the 1,2,4,5- and 1,2,3,4-tetrachlorobenzene present in the mixture.

Thus, according to the invention a product enriched in 1,2,4,5-tetrachlorobenzene is obtained by treating mixtures consisting essentially of 1,2,4,5- and 1,2,3,4-tetrachlorobenzene and pentachlorobenzene in the proportions of less than about 25%, advantageously from about 10% to about 25% 1,2,4,5-tetrachlorobenzene; more than about 60%, advantageously from about 60% to about 80% 1,2,3,4-tetrachlorobenzene; and up to about 15%, advantageously from about 5% to about 15% pentachlorobenzene, based on said chlorobenzenes.

The amount of tetrachloroethylene incorporated in the chlorobenzene mixture is not critical. It must be effective to prevent formation of the eutectic if added before the eutectic composition forms, or to break the eutectic if added after the eutectic forms. In general, it can range from about 5% to about 40% by volume of the mixture to which it is added where the mixture consists essentially of about 10% to about 25% 1,2,4,5-tetrachlorobenzene, about 60% to about 80% 1,2,3,4-tetrachlorobenzene, and about 5% to about 15% pentachlorobenzene, based on the chlorobenzenes. If less than about 5% by volume is used, a thick paste results which is difficult to handle. The use of more than about 40% by volume permits crystallization at a lower temperature. The cost of recovering tetrachloroethylene, however, increases as a greater percentage is used and this consideration limits the amount which is appropriate to use to about 40% by volume. Where the chlorobenzene mixture to which the tetrachloroethylene is added contains more than 25% 1,2,4,5-tetrachlorobenzene, the amount of tetrachloroethylene added, based on the mixture to which it is added, can be less than 5% by volume, for example about 3% by volume.

Separation of material enriched in 1,2,4,5-tetrachlorobenzene from the tetrachloroethylene-containing mixture is preferably effected by cooling to a temperature between about 15° and 30° C. Other means of effecting the separation, such as, for example, evaporation, will occur to those skilled in the art.

In the accompanying drawing there is depicted an example involving treatment with tetrachloroethylene according to the invention in the course of recovering 1,2,4,5-tetrachlorobenzene from a mixture of tetrachlorobenzene isomers derived from benzene hexachloride. Production of various 1,2,4,5-tetrachlorobenzene containing mixtures from benzene hexachloride which are suitable for treatment according to the invention, is described in copending application Serial No. 402,174, filed January 4, 1954, of Churchill and Jenney and also in copending application Serial No. 402,173, filed January 4, 1954, also of Churchill and Jenney. In the embodiment depicted in the drawing, benzene hexachloride is treated to recover therefrom by a known method the gamma isomer which is useful as an insecticide, and the remaining isomers, particularly the alpha and beta isomers, are subjected to a combined dehydrochlorination and chlorination step to produce a mixture of tri- and tetrachlorobenzenes. In this step, liquid phase benzene hexachloride is contacted with suitable proportions of chlorine in the presence of a nuclear chlorination catalyst, e.g., ferric chloride, at temperatures of about 100° to 250° C., and the benzene hexachloride can be converted to a mixture of approximately equal proportions of trichlorobenzenes and tetrachlorobenzenes. Suitable proportions of chlorine to obtain such a mixture are approximately one-half mole of chlorine for each mole of benzene hexachloride. The mixture has an isomer distribution of approximately 45 weight percent 1,2,4-trichlorobenzene, 5 weight percent 1,2,3-trichlorobenzene, 25 weight percent 1,2,4,5-tetrachlorobenzene, 22 weight percent 1,2,3,4-tetrachlorobenzene, and 3 weight percent pentachlorobenzene. This mixture is subjected to a distillation step to obtain an overhead trichlorobenzene fraction containing about 90 percent or more 1,2,4-trichlorobenzene, and not over about 10 percent of 1,2,3-trichlorobenzene, and a bottoms fraction comprising about 50 percent of 1,2,4,5-tetrachlorobenzene, about 44 percent of 1,2,3,4-tetrachlorobenzene and about 6 percent pentachlorobenzene. There is also present in the bottoms fraction a small amount of 1,2,3,5-tetrachlorobenzene. The bottoms fraction is suitable for treatment to recover therefrom 1,2,4,5-tetrachlorobenzene.

To obtain a 1,2,4,5-tetrachlorobenzene-containing mixture richer in 1,2,4,5-tetrachlorobenzene, as is indicated in the drawing, the trichlorobenzene fraction from the distillation step can be subjected to a chlorination step, and the resulting chlorinated product distilled to remove remaining trichlorobenzenes. When, in this chlorination step, 50 percent of the trichlorobenzene fraction has been chlorinated, the approximate composition of the mixture is 47 percent 1,2,4-trichlorobenzene, 3 percent 1,2,3-trichlorobenzene, 30 percent 1,2,4,5-tetrachlorobenzene, 18 percent 1,2,3,4-tetrachlorobenzene, and 2 percent pentachlorobenzene. When this material is distilled, a crude tetrachlorobenzene fraction containing about 60 percent 1,2,4,5-tetrachlorobenzene, about 36 percent of 1,2,3,4-tetrachlorobenzene and about 4 percent of pentachlorobenzene is obtained. There is also present in the bottoms fraction a small amount of 1,2,3,5-tetrachlorobenzene.

Thus, a bottoms product can be obtained which comprises about 50% to 60% 1,2,4,5-tetrachlorobenzene, about 36% to about 45% 1,2,3,4-tetrachlorobenzene and about 4% to 6% pentachlorobenzene. This bottoms mixture is subjected to a first crystallization step involving cooling to a temperature between about 45° and 50° C., whereupon a portion of the 1,2,4,5-tetrachlorobenzene separates out as crystals of at least about 95% purity. The mother liquor resulting from this crystallization step comprises essentially a ternary eutectic composition of about 15% to 18% 1,2,4,5-tetrachlorobenzene, about 70% to 73% 1,2,3,4-tetrachlorobenzene and about 10% to 12% pentachlorobenzene. A small amount of 1,2,3,5-tetrachlorobenzene is also present in the mother liquor. The substantially pure 1,2,4,5-tetrachlorobenzene crystals resulting from the first crystallization step are separated from the mother liquor.

The mother liquor is then treated with tetrachloroethylene according to the invention to recover therefrom 1,2,4,5-tetrachlorobenzene. There is added to the mother liquor at least 5% by volume of tetrachloroethylene. The resulting tetrachloroethylene-containing solution is then subjected to a second crystallization step of cooling to effect crystallization of 1,2,4,5-tetrachlorobenzene product. In the second crystallization step, the tetrachloroethylene solution is cooled to a temperature between about 15° and 30° C., and preferably about 25° C. The tetrachlorobenzene product comprises about 50% to 80% 1,2,4,5-tetrachlorobenzene, about 15% to 30% 1,2,3,4-tetrachlorobenzene and about 5% to 20% other chlorobenzenes and tetrachloroethylene, and the concentration of 1,2,4,5-tetrachlorobenzene in the tetrachloroethylene-containing material is reduced to less than the eutectic concentration of about 14% to 15%.

The tetrachlorobenzene product crystallized in the second crystallization step is separated from the mother liquor resulting from the second crystallization step and is sufficiently enriched in 1,2,4,5-tetrachlorobenzene that it can be melted and cooled in a third crystallization step to a temperature below about 50° C., preferably to a temperature between 45° and 50° C., to crystallize out substantially pure 1,2,4,5-tetrachlorobenzene, i.e. 95% or more tetrachlorobenzene. The mother liquor from the third crystallization step can be discarded or treated for recovery of values contained therein.

Alternatively, and advantageously, the product crystallized in the second crystallization step can be recycled as is indicated on the drawing to the first crystallization step. In this way, 1,2,4,5-tetrachlorobenzene values in the 1,2,4,5-tetrachlorobenzene product of the second crystallization step can be recovered in substantially pure form without the use of a third crystallization step.

The mother liquor from the second crystallization step is subjected to distillation to recover tetrachloroethylene as overhead and the recovered tetrachloroethylene can be recycled to the second crystallization step. The bottoms from this distillation can be discarded or subjected to treatment for the recovery of values contained therein.

Tetrachlorobenzene product crystallized in the second crystallization step and added to the mixture to be subjected to the first crystallization step preferably contains not less than about 40% 1,2,4,5-tetrachlorobenzene as lower concentrations of 1,2,4,5-tetrachlorobenzene will decrease the yield in the first crystallization step and impose greater volume requirements on the apparatus. The mother liquor resulting from the second crystallization step can contain as little as about 5% of the 1,2,4,5-tetrachlorobenzene present in the mixture subjected to the first crystallization step.

The following examples illustrate the method of the invention.

*Example I*

Benzene hexachloride from which the gamma isomer had been removed was dehydrochlorinated at a temperature of 210–216° C., in liquid phase using as a dehydrochlorinating agent about 2 grams of chlorine per kilogram of benzene hexachloride per minute. The product of this step comprised a mixture of about 65 to 70% of 1,2,4-trichlorobenzene, about 25% of 1,2,3-trichlorobenzene and about 6% of tetrachlorobenzene. This trichlorobenzene product was chlorinated by introducing 285 grams of chlorine per kilogram of trichlorobenzene product at 190° C. The product of this chlorination step was distilled to remove unreacted trichlorobenzenes and other lower-boiling materials and the bottoms were subjected to a first crystallization step consisting of chilling to 50° C., and centrifuging. The 1,2,4,5-tetrachlorobenzene crystals separated in this way had a purity of about 95 percent to 99 percent, and the mother liquor had the following composition:

|  | Percent |
|---|---|
| 1,2,4,5-tetrachlorobenzene | 14.0 |
| 1,2,3,4-tetrachlorobenzene | 72.0 |
| Pentachlorobenzene | 11.5 |
| Other polychlorobenzenes | 2.5 |

About 1.5 liters, or 2.3 kilograms of this mother liquor was dissolved in 150 milliliters, or 266 grams of tetrachloroethylene, and the resulting solution was cooled to 23° C. in a second crystallization step to produce 340 grams of crystals having the following composition:

|  | Percent |
|---|---|
| 1,2,4,5-tetrachlorobenzene | 66.5 |
| 1,2,3,4-tetrachlorobenzene | 24.0 |
| Pentachlorobenzene | 5.5 |
| Tetrachloroethylene | 4.0 |
| Other polychlorobenzenes | Trace |

Thus, over 70 percent of the 1,2,4,5-tetrachlorobenzene was recovered from the mother liquor remaining after the first crystallization step.

The tetrachlorobenzene product (the crystals obtained in the second crystallization step) is then melted and recycled to the first crystallization step, or alternatively, is cooled to a temperature between about 45° to 50° C., whereupon substantially pure 1,2,4,5-tetrachlorobenzene crystallizes out.

The liquid remaining after the second crystallization step was distilled to recover the tetrachloroethylene. The overhead comprised 210 grams of a mixture having the following composition:

|  | Percent |
|---|---|
| 1,2,3,4-tetrachlorobenzene | 2.5 |
| Tetrachloroethylene | 97.5 |

In this way, 77 percent of the tetrachloroethylene was recovered. The bottoms from this step comprised 1996 grams of the following composition:

|  | Percent |
|---|---|
| 1,2,4,5-tetrachlorobenzene | 6.0 |
| 1,2,3,4-tetrachlorobenzene | 77.5 |
| Pentachlorobenzene | 12.5 |
| Tetrachloroethylene | 2.0 |
| Other polychlorobenzenes | 2.0 |

*Example II*

In the manner described in Example I, benzene hexachloride was dehydrochlorinated, the dehydrochlorination product was chlorinated and then topped to remove trichlorobenzenes and recover bottoms comprising tetrachlorobenzene isomers. The bottoms were withdrawn from the still and subjected to a first crystallization step involving cooling to about 50° C., whereupon substantially pure 1,2,4,5-tetrachlorobenzene crystallized out. After removal of the 1,2,4,5-tetrachlorobenzene crystals, mother liquor of the following composition remained:

|  | Percent |
|---|---|
| 1,2,4,5-tetrachlorobenzene | 14.5 |
| 1,2,3,4-tetrachlorobenzene | 70.5 |
| 1,2,3,5-tetrachlorobenzene | 0.5 |
| Pentachlorobenzene | 10.5 |
| Hexachlorobenzene | 1.0 |
| Other polychlorobenzenes | 3.0 |

About 1.5 liters (2300 grams) of this mother liquor was dissolved in 1.05 liters (1.66 kilograms) of tetrachloroethylene and the mixture was subjected to a second crystallization step involving cooling to 20° C., and filtering. About 180 grams of the following mixture was obtained in this way:

|  | Percent |
|---|---|
| 1,2,4,5-tetrachlorobenzene | 72 |
| 1,2,3,4-tetrachlorobenzene | 17 |
| Pentachlorobenzene | 4 |
| Tetrachloroethylene | 6 |
| Other polychlorobenzenes | 1 |

The filtrate was distilled to remove 0.5 liter of tetrachloroethylene and chilled to 18° C., whereupon 79 grams of the following mixture was recovered by filtration:

|  | Percent |
|---|---|
| 1,2,4,5-tetrachlorobenzene | 53.5 |
| 1,2,3,4-tetrachlorobenzene | 30.5 |
| Pentachlorobenzene | 5.5 |
| Tetrachloroethylene | 8.5 |
| Other polychlorobenzenes | 2.0 |

The recovery of 1,2,4,5-tetrachlorobenzene in the two crystallization steps in which tetrachloroethylene was present was 51 percent.

Quantities expressed in percent in the specification and claims are percent by weight unless otherwise indicated.

What is claimed is:

1. The method of separating material enriched in 1,2,4,5-tetrachlorobenzene from a mixture consisting essentially of 1,2,4,5-tetrachlorobenzene, 1,2,3,4-tetrachlorobenzene and pentachlorobenzene in the proportions of less than about 25% by weight 1,2,4,5-tetrachlorobenzene, more than 60% by weight 1,2,3,4-tetrachlorobenzene and up to about 15% by weight pentachlorobenzene, based on the said chlorobenzenes, which comprises incorporating in said mixture at least about 5 percent by volume of tetrachloroethylene and cooling the resulting tetrachloroethylene-containing material to a temperature of about 15 to 30° C. to separate a product containing 1,2,4,5-tetrachlorobenzene and 1,2,3,4-tetrachlorobenzene and enriched in 1,2,4,5-tetrachlorobenzene.

2. The method of separating material enriched in 1,2,4,5-tetrachlorobenzene from a mixture consisting essentially of from about 10% to about 25% by weight 1,2,4,5-tetrachlorobenzene, about 60% to about 85% by weight 1,2,3,4-tetrachlorobenzene and about 5% to about 15% by weight pentachlorobenzene, based on said chlorobenzenes, which comprises incorporating in said mixture at least about 5% by volume of tetrachloroethylene and cooling the resulting tetrachloroethylene-containing material to a temperature of about 15 to 30° C. to separate a product containing 1,2,4,5-tetrachlorobenzene and 1,2,3,4-tetrachlorobenzene and enriched in 1,2,4,5-tetrachlorobenzene.

3. The method of claim 2 wherein the amount of tetrachloroethylene used is from about 5% to about 40% by volume of said mixture.

4. The method of separating material enriched in 1,2,4,5-tetrachlorobenzene from a eutectic composition consisting essentially of about 14% to about 15% by weight 1,2,4,5-tetrachlorobenzene, about 70% to about 73% by weight 1,2,3,4-tetrachlorobenzene and about 10% to about 12% by weight pentachlorobenzene, based on said chlorobenzenes, which comprises incorporating in said mixture at least about 5% by volume of tetrachloroethylene and cooling the resulting tetrachloroethylene-containing material to a temperature of about 15 to 30° C. to separate a product containing 1,2,4,5-tetrachlorobenzene and 1,2,3,4-tetrachlorobenzene and enriched in 1,2,4,5-tetrachlorobenzene.

5. The method of claim 4 wherein the amount of tetrachloroethylene used is from about 5% to about 40% by volume of said mixture.

6. The method of separating 1,2,4,5-tetrachlorobenzene from a mixture consisting essentially of 1,2,4,5-tetrachlorobenzene, 1,2,3,4-tetrachlorobenzene and pentachlorobenzene, the proportion of 1,2,4,5-tetrachlorobenzene being more than about 14% to about 15% by weight based on said chlorobenzenes, comprising subjecting said mixture to a first crystallization step of cooling to a temperature between about 45° to 50° C., to effect crystallization of a portion of the 1,2,4,5-tetrachlorobenzene in substantially pure form, separating the resulting crystals from the resulting mother liquor, incorporating in the mother liquor tetrachloroethylene in the amount of about 5% to about 40% by volume of the mother liquor, subjecting the resulting tetrachloroethylene-containing material to a second crystallization step of cooling to a temperature between about 15° to 30° C., to effect crystallization of a product containing 1,2,4,5-tetrachlorobenzene and 1,2,3,4-tetrachlorobenzene and enriched in 1,2,4,5-tetrachlorobenzene whereby the concentration of 1,2,4,5-tetrachlorobenzene in the tetrachloroethylene-containing material is reduced to less than about 14% to 15% by weight based on 1,2,4,5-tetrachlorobenzene, 1,2,3,4-tetrachlorobenzene and pentachlorobenzene present in the tetrachloroethylene-containing material, separating the enriched product from the mother liquor resulting from the second crystallization step and adding said product to the mixture subjected to the first crystallization step.

7. The method of claim 6 in which said mixture is obtained by dehydrochlorinating benzene hexachloride to form a mixture of isomers of trichlorobenzene and chlorinating the mixture containing trichlorobenzene isomers.

8. The method of claim 1 in which the amount of tetrachloroethylene used is about 5 to about 40% by volume of said mixture.

References Cited in the file of this patent

UNITED STATES PATENTS

| | | |
|---|---|---|
| 2,721,224 | Rosin | Oct. 18, 1955 |
| 2,805,264 | Kissling | Sept. 3, 1957 |

UNITED STATES PATENT OFFICE
CERTIFICATE OF CORRECTION

Patent No. 2,938,929            May 31, 1960

Clarence W. Bareis

It is hereby certified that error appears in the printed specification of the above numbered patent requiring correction and that the said Letters Patent should read as corrected below.

Column 2, line 40, strike out "less 1,2,4,5-tetrachlorobenzene than is present in the eu-"; line 41, after "eu-" insert -- tectic composition. Thus, the mixture can contain as --.

Signed and sealed this 4th day of April 1961.

(SEAL)
Attest:    ERNEST W. SWIDER

~~XXXXXXXXXXX~~
Attesting Officer

ARTHUR W. CROCKER
Acting Commissioner of Patents